United States Patent [19]

Scholte

[11] Patent Number: 4,613,148

[45] Date of Patent: Sep. 23, 1986

[54] DETACHABLE TOWING BRACKET

[75] Inventor: Bob Scholte, Dongen, Netherlands

[73] Assignee: Tobo Made B.V., Made, Netherlands

[21] Appl. No.: 674,954

[22] PCT Filed: Mar. 15, 1984

[86] PCT No.: PCT/EP84/00078

§ 371 Date: Nov. 16, 1984

§ 102(e) Date: Nov. 16, 1984

[87] PCT Pub. No.: WO84/03666

PCT Pub. Date: Sep. 27, 1984

[30] Foreign Application Priority Data

Mar. 21, 1983 [NL] Netherlands ......................... 8300996

[51] Int. Cl.$^4$ .............................................. B60D 1/06
[52] U.S. Cl. .............................. 280/491 E; 248/224.2
[58] Field of Search ............... 280/491 R, 491 E, 504, 280/511; 403/381, 331, 407; 248/223.4, 224.2, 222.1

[56] References Cited

U.S. PATENT DOCUMENTS 1,252,207  1/1918  Walker ........................... 248/224.2

FOREIGN PATENT DOCUMENTS 2348073  10/1977  France ........................... 280/491 E Primary Examiner—John L. Love
Assistant Examiner—Donn McGiehan
Attorney, Agent, or Firm—Majestic, Gallagher, Parsons & Siebert

[57] ABSTRACT

A detachable towing bracket for a vehicle, particularly for an automobile. The towing bracket includes a towing hook with a first coupling member which is engageable to a second coupling member having fittings attachable to the towing vehicle. The coupling members are linked together by a tapered dovetailed connection, which linkage is tapered so as to prevent wear. Connection is secured by a spring-loaded locking pin which positively prevents separation of parts.

4 Claims, 7 Drawing Figures

DETACHABLE TOWING BRACKET

The invention relates to a detachable towing bracket for a vehicle, in particular for an automobile, in which the towing hook with a first coupling member can be slid vertically upwards and thus become detached from a second coupling member with fittings to be attached to the vehicle, and in which the first coupling member, when slid vertically downwards, is arrested in place by facilities provided on the second coupling member, whilst the coupling members have been designed as trapezoid plates and can be linked together by means of a dovetail joint.

Such a towing bracket is known from the French patent specification No. 7611632 which describes a number of embodiments for the coupling members. They relate in the main to prismatic vertical and horizontal dovetail joints. In the vertical dovetail joints, a vertical arrestment is effected by means of a lamellar closure of the groove or a groove diminishing in cross-section going down.

A disadvantage of the known embodiment is that in the direction of travel clearance occurs in the coupling with downturned grooves, through the rectangular cross-section, in consequence of which the coupling members may shift in the said direction, resulting in wear of the coupling. It is an object of the present invention to ameliorate this situation. To this end, such a towing bracket has been designed so that the raised edges of the second trapezoid coupling member approximately taper over its entire cross-section, whilst the dovetailed groove-forming edges of the first coupling member taper correspondingly in cross-section.

In a further elaboration of the invention, provision is made for a locking pin which is forced under spring tension into locked position, which is provided with a tapering end, which runs substantially crosswise of the flat coupling plate and which is fitted on the first coupling member, in such a fashion that with the towing bracket in coupled position the locking pin runs eccentrically relative to a bore in the second coupling member for receiving the locking pin. This arrangement has the advantage that the locking pin fits snugly at all times within the bore through the second coupling member.

Further particulars of the invention will emerge from the following 5 descriptions of a few embodiments given by way of example with reference to the accompanying drawings, in which FIG. 1 is a lateral view of an embodiment of the detachable towing bracket, with the first and the second coupling member;

Figure 1:
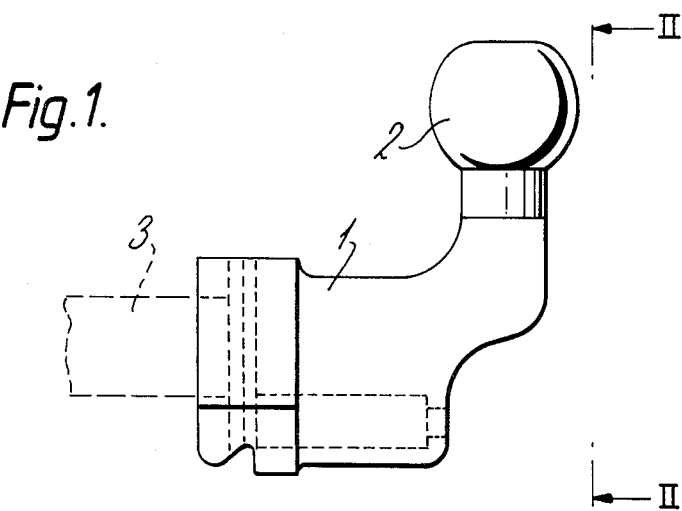

The detachable towing bracket according to FIG. 1 substantially comprises the first coupling member 1 with the coupling bar on coupling ball 2 and the second coupling member 3 (dashed line).

Figure 2:
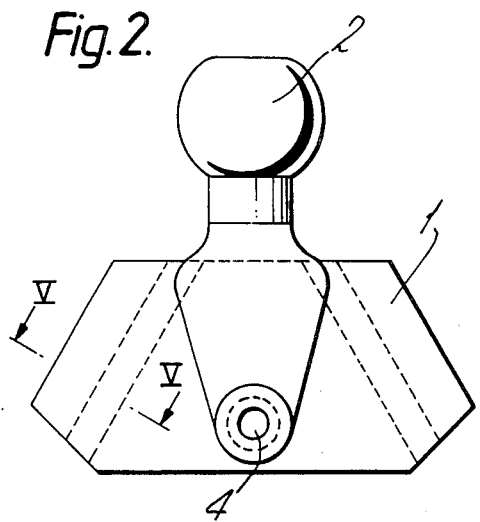
FIG. 2 is a view of the first coupling member in the direction of the line II—II in FIG. 1.

FIG. 2 depicts the first coupling member 1 with the coupling bar or ball 2 in front elevation viewed in the direction of line II—II. Also represented is the bore 4 for the locking pin.

Figure 3:
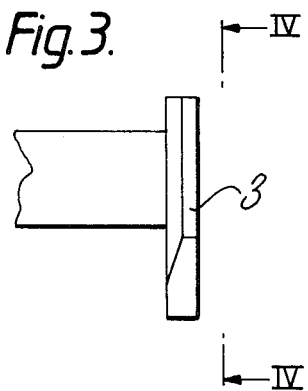
FIG. 3 is a lateral view of the second coupling member mounted on the vehicle.
Figure 4:
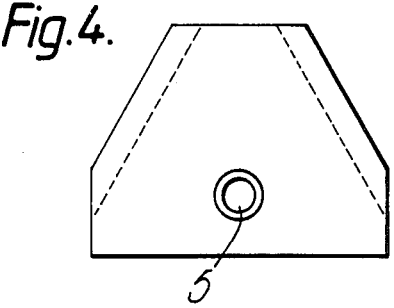
FIG. 4 is a view of the second coupling member in the direction of line IV—IV in FIG. 3.

FIG. 3 presents a lateral view of the second coupling member 3, and FIG. 4 a front view of the same coupling member 3 in the direction of line IV—IV, including the bore 5 for receiving the locking pin.

Figure 5:
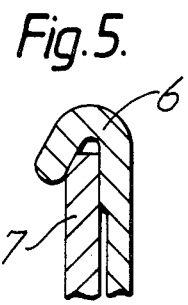
FIG. 5 is a cross-sectional view in the direction of line V—V in FIG. 2.

FIG. 5 is a cross-sectional representation of the dovetailed groove-forming edge 6 of the first coupling member 1. The dovetailed groove-forming edge 6 clasps the corresponding tapering edge 7 of the second coupling element 3.

Figure 6:
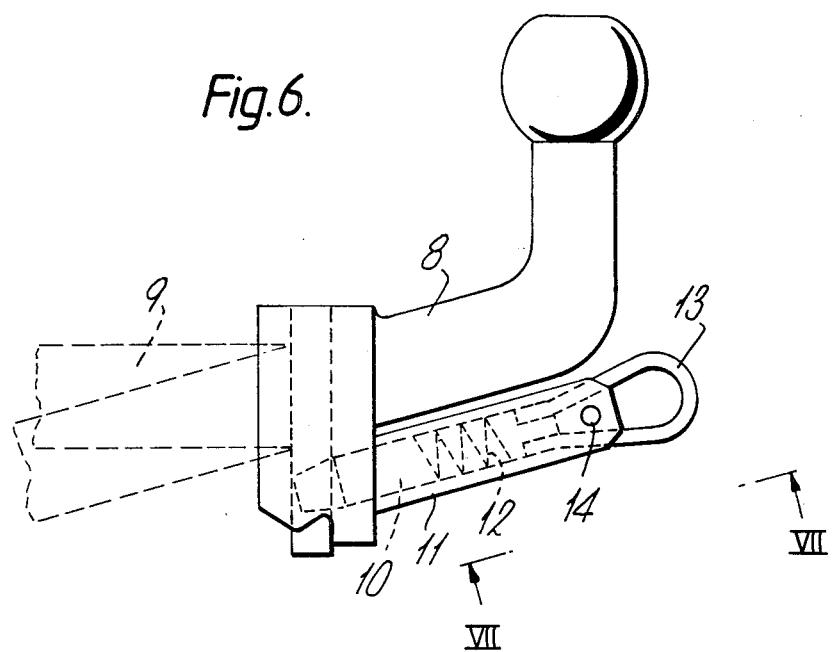
FIG. 6 is a lateral view of an alternative embodiment of the detachable towing bracket with the first and the second coupling member.

FIG. 6 presents a lateral view of an alternative embodiment of the detachable towing bracket with the first coupling member 8 and the second coupling member 9 (dashed line). It also depicts in lateral view the locking pin 10 in locked position together with the barrel 11, the spring 12 and the handling lug 13. The locking pin 10 is secured in position with a bolt member 14.

Figure 7:
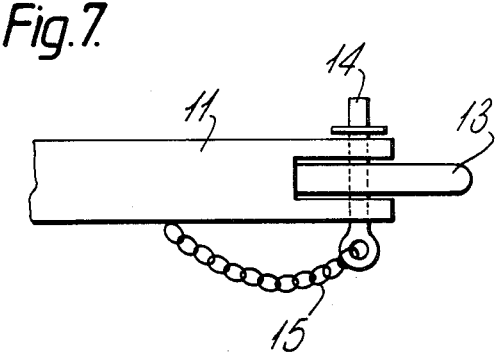
FIG. 7 is a view in the direction of line VII—VII in FIG. 6.

FIG. 7 presents a front view of the bolt pin 14 in the direction of line VII—VII in FIG. 6, showing that pin 14 is safeguarded against loss by means of a chain 15 which is attached to the first coupling member 8.

I claim:

1. A detachable towing bracket for a vehicle, comprising:

a towing hook having a first coupling member, said first coupling member being slidably engageable in a dovetailed connection with a second coupling member attachable to said vehicle, said first and second coupling members being disengageable upon sliding of said first coupling member in a first direction, and engageable upon sliding of said first coupling member in a second direction opposed to said first direction, said first coupling member being provided with at least one groove adapted to fit at least one corresponding raised edge on said second coupling member, said groove and said edge correspondingly tapering in cross-section, said second coupling member being provided with a substantially flat plate slidably mountable in a corresponding slot on said first coupling member;

a retaining means for securing said first coupling member to said second coupling member, said retaining means being insertable through said first coupling member into said second coupling member through said dovetailed connection and comprising a barrel aligned substantially parallel to said first coupling means and a pin movably contained within said barrel, said pin having a tapered end insertable into said dovetailed connection, said barrel further having an open end oppositely disposed to said tapered end; and, a spring-loaded locking mechanism provided on said barrel comprising a spring internal to said barrel, said spring being compressed upon locking of said retaining means in said dovetailed connection, said compression being maintained by a lug insertable into said open end.

2. The towing bracket of claim 1, wherein said retaining means is further held in locked position by a securing means, which securing means maintains said spring in a compressed position and ensures retention of said lug within said open end.

3. The towing bracket of claim 2, wherein said securing means comprises a bolt member crosswise insertable through an aperture in said open end.

4. The towing bracket of claim 3, wherein said bolt is additionally operatively connected to said barrel.

* * * * *